United States Patent [19]

Beaudet

[11] Patent Number: 4,924,814
[45] Date of Patent: May 15, 1990

[54] PET RESTRAINER FOR PASSENGER VEHICLES

[76] Inventor: Alain B. Beaudet, P.O. Box 33116, San Diego, Calif. 92103

[21] Appl. No.: 245,808

[22] Filed: Sep. 19, 1988

[51] Int. Cl.$^5$ .................. A01F 29/00; B60R 21/06
[52] U.S. Cl. ............................ 119/96; 280/749; 296/24.2
[58] Field of Search ............ 119/96, 15; 280/749 R, 280/748, 728; 296/24.1, 24.2

[56] References Cited

U.S. PATENT DOCUMENTS

| | | | |
|---|---|---|---|
| 1,959,974 | 5/1934 | Westgate | 280/749 |
| 2,564,480 | 8/1951 | Jones | 280/749 |
| 3,169,781 | 2/1965 | Abruzziuo | 280/749 |
| 3,190,687 | 6/1965 | Johnson | 280/748 |

FOREIGN PATENT DOCUMENTS 2033849 5/1980 United Kingdom ............ 280/749

*Primary Examiner*—John Weiss
*Attorney, Agent, or Firm*—Ralph S. Branscomb

[57] ABSTRACT

An apparatus is provided for restraining a pet in the rear seat of a passenger vehicle, and protecting the rear vehicle seat. The apparatus is basically 2 parts, a substantially vertical net stretched across the vehicle just behind the driver's seat, and a quilted cover that covers both the bottom and the backrest of the rear seat, and connects to the vertical net, so that the pet is constrained to the back seat area and the back seat is protected from dirt and scratching and tearing.

1 Claim, 2 Drawing Sheets

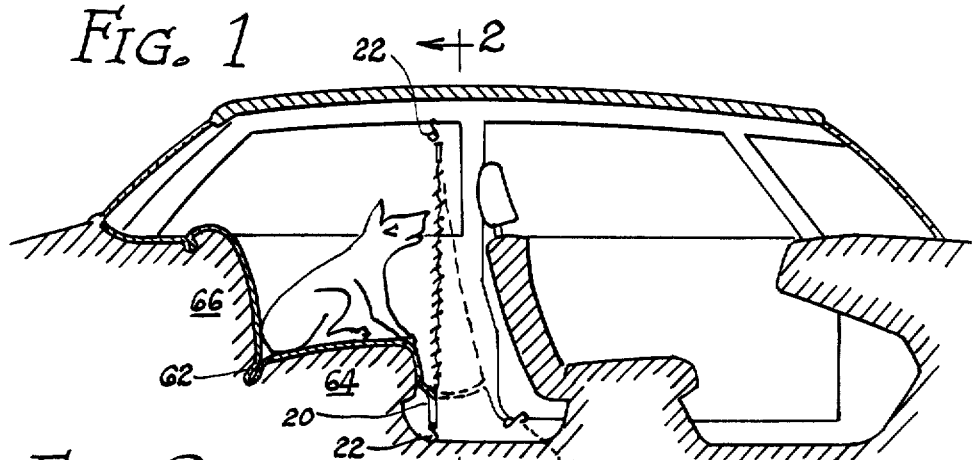
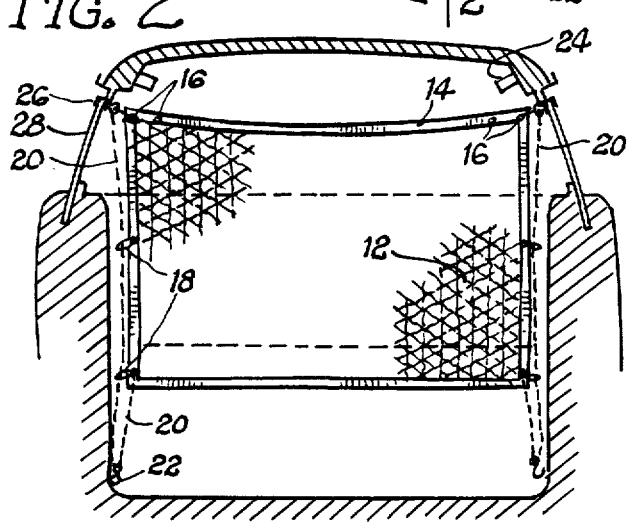
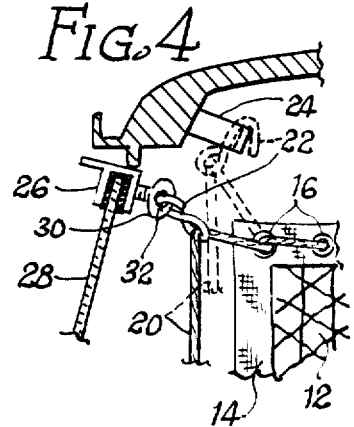
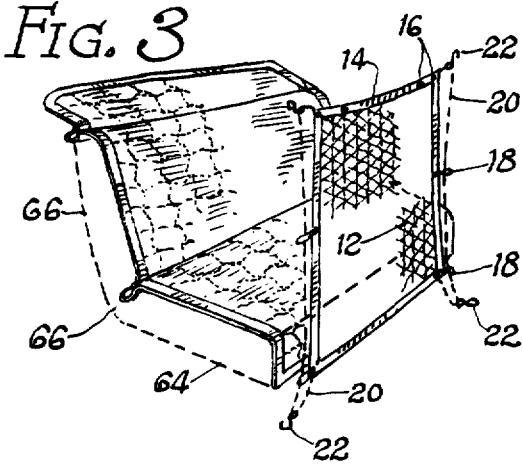
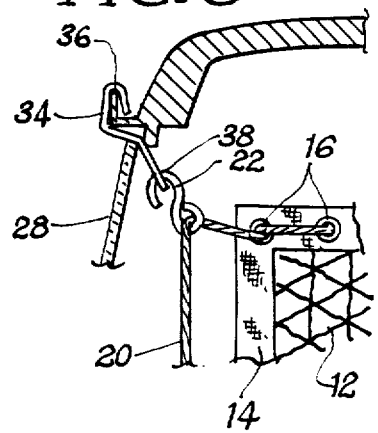

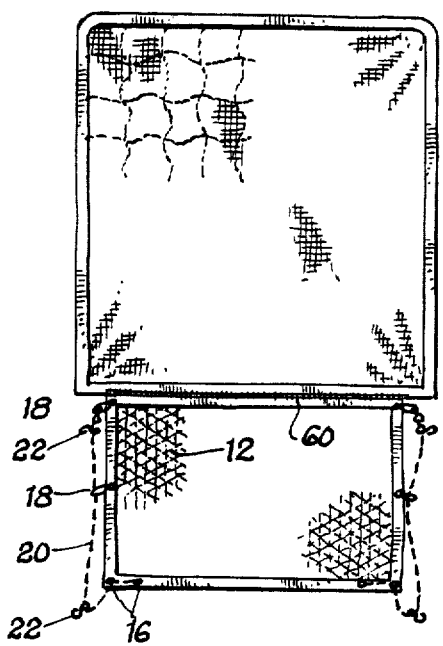
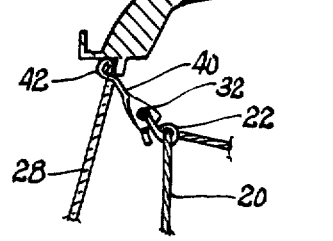
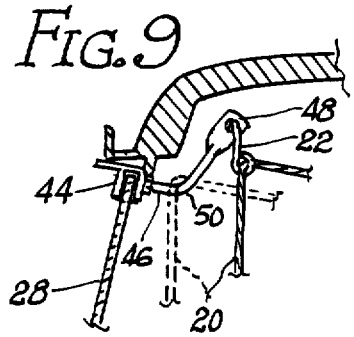
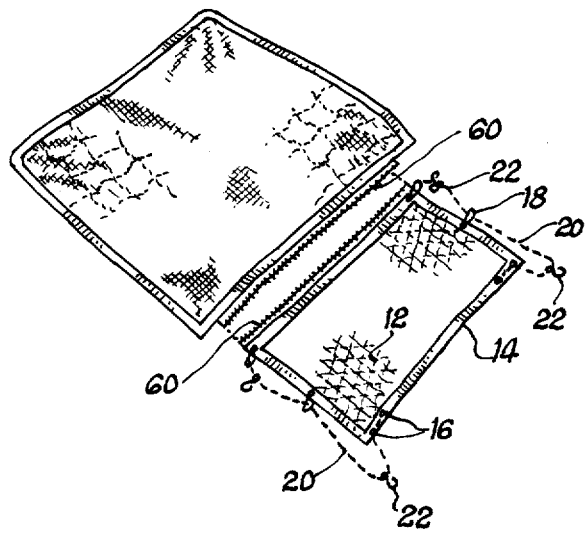
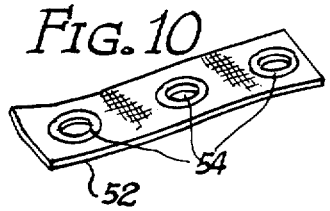
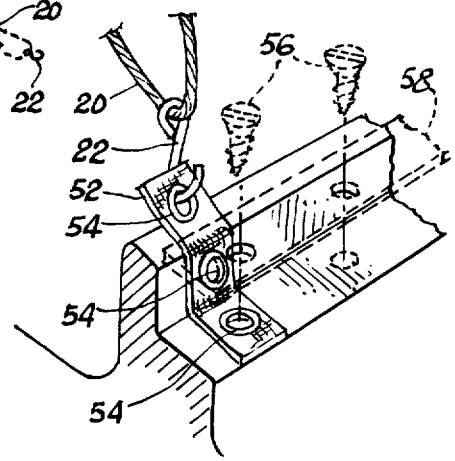

PET RESTRAINER FOR PASSENGER VEHICLES

BACKGROUND OF THE INVENTION

Pets are an eternal part of life in America and other countries, and generate interest that ranges from mild to obsessive. Many people take their pets with them in their vehicles, and especially in the case of large dogs, the pets can be not only destructive to the interior of the vehicle, but a genuine hazard if they tend to jump upon the driver, interfering with his driving and distracting him from the road.

Devices have been created to provide barriers in cars to keep the pet in the back seat, and nets are sometimes used in pickup trucks to prevent the pet from sliding, or jumping, out. There is a need, however, for a comprehensive apparatus that will fit in virtually any passenger car, and provide, in an integral unit, not only a net to keep the pet in the rear region of the vehicle, but a cover for the rear seat as well, so that the driver can drive with the assurance that the pet will not be able to interfere with his driving, and that the rear seat area of the vehicle will remain clean and undamaged.

SUMMARY OF THE INVENTION

The instant invention fulfills the above-stated need and provides a net which is stretched substantially vertically across the interior of the vehicle just behind the driver's seat. The net has a peripheral cord which engages spaced hooks to hook onto the interior of the vehicle, and the lower edge of the net connects by means of an openable zipper to the rear seat cover. The cover is preferably quilted and quite durable, and stretches over the bottom portion of the rear seat, with a tuck that tucks between the bottom portion and the rear backrest. The cover then continues upward beyond the tuck, and over the rear of the back seat and tucks behind the upper portion of the seat's backrest.

BRIEF DESCRIPTION OF THE DRAWINGS

FIG. 1 is a diagrammatic view, in section indicating how the apparatus and a pet fit into the rear seat of a passenger vehicle;

FIG. 2 is a view taken along line 2—2 of FIG. 1;

FIG. 3 is a perspective view of the apparatus in place in place but not showing the vehicle;

FIG. 4 is a transverse section taken through the rear window of a typical window showing the installation of a window clamp;

FIG. 5 is a view identical to FIG. 4 except it shows the installation of a gutter clamp;

FIG. 6 illustrates the pet constraining apparatus fully extended;

FIG. 7 illustrates in isometric the rear seat cover unzipped from the net portion;

FIG. 8 is a section illustrating yet another rear window mount for the cord hook;

FIG. 9 is a transverse section through the rear view window showing yet another means of attachment for the net;

FIG. 10 illustrates a strap used at the lower edges of the net to engage a hook in the car molding;

FIG. 11 illustrates the strap of FIG. 10 engaged under the molding of the vehicle, with a hook engaged in the strap eyelet.

DETAILED DESCRIPTION OF THE PREFERRED EMBODIMENT

The apparatus has a large-weave net 12 which is very durable to constrain even a large pet, and yet does not substantially interfere with rear visibility. The net has a peripheral hem 14, and this hem mounts eyelets 16 along the top, and loops 18 along the sides, so that a cord 20 can be engaged through the eyelets and loops to mount hooks 22 which hook into various attachment points in the interior of the vehicle to securely stretch net 12 transversely across the vehicles interior. The cord 20 would ordinarily be a resilient cord, sometimes known as a "bunge cord".

Interior attachment points for the hooks 22 vary from vehicle to vehicle. At the top, some vehicles will attach at the handholds 24 as shown in FIGS. 2 & 4. If there are no handholds however, attachment points may be provided by using the window clamps 26 as shown in FIG. 4, which engage the upper edge of the window 28 and are held in place with a set screw 30 which is apertured at 32 to provide an attachment point for one of the hooks 22.

An alternative to the window clamp is a gutter clamp 34 that hooks onto the gutter 36 as shown FIG. 5, having an eyelet 38 which is engaged by one of the hooks 22.

FIG. 8 shows yet another attachment in which a strap 40 has a bulge 42 trapped just outside the window to secure to the hook eyelet, and FIG. 9 illustrates yet another window bracket 44 which defines an arm 46 with a terminal eyelet 48 to engage the hook, and also an elbow 50 so that the cord 20 can be used directly without the use of hooks.

The lower portion of the net is secured by the hooks at the distal ends of the cord 20. These hooks can be hooked underneath the molding, or straps 52 can be used, which have spaced eyelets 54, the lower of which can be aligned with molding screws 56 and sandwiched down with molding cap 58. The extended upper eyelet 54 is used to engage the hook 22 as shown in FIG. 11.

Thus, in virtually every passenger vehicle, with the addition of the various clamps and the lower strap, there are means for attaching the lower restraining net in all four corners. The rear seat cover is connected to the restraining net along the bottom, and in the preferred embodiment this is done by means of connecting a zipper 60 that extends substantially along the entire borders of both the cover and the net. The cover itself is preferably quilted, as indicated in FIG. 3, and is made of a fairly tough fabric and is extensive enough to form a transverse tuck 62 which is tucked between the rear seat bottom 64 and the back support or backrest 66.

The cover is long enough to extend back over the backrest portion of the seat and to be tucked behind it, as shown in FIG. 1. Although some elastic straps might be added to accommodate particular vehicles, the basic structure of the cover shown herein will fit on most seats and permit the secure tucking in of the cover all around the bottom and backrest portion of the seat, and the absence of elastic straps and other connectors make the cover universal.

The pet restrainer illustrated, disclosed and claimed herein in the ideal, state-of-the-art restrainer for the passenger car. It solves the dual problems of pets distracting the driver, and messing up the seats and floor of the vehicle, and is expected to replace existing restrainers, and become a common sight after the unit is marketed in several months.

I claim:

1. An apparatus for constraining an animal behind the driver's seat of a vehicle comprising:
    (a) a flexible see-through sheet;
    (b) a securing means to secure said sheet in place and substantially transversely of the vehicle's longitudinal axis behind the driver's seat; and
    (c) a flexible protective cover attached to said sheet and being dimensioned to substantially cover both the seat and backrest of the rear seat of the vehicle, and wrap over the backrest, such that a pet can be constrained to the rear portion of the vehicle by said sheet, and the rear seat of the vehicle will be protected from the pet by said cover;
    (d) said securing means comprising a plurality of hooks connected to said sheet for attachment to various attachment points on the interior of said vehicle;
    (e) a cord connected to and passing along at least a portion of the periphery of said sheet and attaching said hooks, said cord being resilient such that said sheet can be stretched into place under tension;
    (f) a pair of strips having mounting eyelets for respective mounting eyelets for respective mounting to each side of the vehicle, said strips being adapted to being mounted to the lower interior molding of the vehicle to permit engagement of said hooks in said eyelets;
    (g) said cover being attached to said sheet with a substantially continuous zipper so said cover and said sheet are separable; and
    (h) said cover having an elongated transverse tuck therein to insert between the bottom and the backrest of the rear seat to hold said cover in place.

* * * * *